United States Patent
Shinotsuka

(10) Patent No.: US 9,432,775 B2
(45) Date of Patent: Aug. 30, 2016

(54) ENERGY CONVERSION APPARATUS

(71) Applicant: Michiaki Shinotsuka, Kanagawa (JP)

(72) Inventor: Michiaki Shinotsuka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 203 days.

(21) Appl. No.: 14/295,450

(22) Filed: Jun. 4, 2014

(65) Prior Publication Data

US 2015/0003661 A1    Jan. 1, 2015

(30) Foreign Application Priority Data

Jun. 27, 2013  (JP) .................................. 2013-135117
Dec. 27, 2013  (JP) .................................. 2013-271030

(51) Int. Cl.
| | |
|---|---|
| *H04R 15/00* | (2006.01) |
| *H04R 3/00* | (2006.01) |
| *H04R 1/00* | (2006.01) |
| *H04R 9/00* | (2006.01) |
| *H04R 9/04* | (2006.01) |
| *H02K 41/025* | (2006.01) |

(52) U.S. Cl.
CPC .................. *H04R 15/00* (2013.01); *H04R 1/00* (2013.01); *H04R 3/00* (2013.01); *H04R 9/00* (2013.01); *H04R 9/047* (2013.01); *H02K 41/025* (2013.01); *H04R 2201/003* (2013.01)

(58) Field of Classification Search
CPC .......... H04R 9/025; H04R 7/04; H04R 7/045; H04R 7/06; H04R 7/10; H04R 7/16; H04R 7/24; H04R 7/26; H02K 41/025; H02K 41/0356

USPC ........ 381/400, 408, 410, 419, 423, 426, 431
See application file for complete search history.

(56) References Cited

U.S. PATENT DOCUMENTS

| | | | | |
|---|---|---|---|---|
| 3,164,686 | A * | 1/1965 | Tibbetts ................ | H04R 9/047 381/412 |
| 3,674,946 | A | 7/1972 | Winey | |
| 4,276,452 | A * | 6/1981 | Suyama ................ | H04R 9/047 381/421 |
| 7,903,834 | B1 * | 3/2011 | Graber .................. | H04R 1/403 381/334 |
| 8,942,408 | B1 * | 1/2015 | Croft, III .............. | H04R 9/025 381/152 |
| 2005/0100181 | A1 | 5/2005 | Croft, III et al. | |
| 2010/0104115 | A1 * | 4/2010 | Zheng ..................... | H04R 1/00 381/412 |
| 2013/0306903 | A1 | 11/2013 | Shinotsuka | |

FOREIGN PATENT DOCUMENTS

| | | |
|---|---|---|
| JP | 9-331596 | 12/1997 |
| JP | 2008-199116 A | 8/2008 |
| JP | 2008-270970 A | 11/2008 |
| JP | 2008-270971 A | 11/2008 |

(Continued)

OTHER PUBLICATIONS

Extended European Search Report issued Nov. 6, 2014 in Patent Application No. 14172461.7.

*Primary Examiner* — Jesse Elbin

(74) *Attorney, Agent, or Firm* — Oblon, McClelland, Maier & Neustadt, L.L.P.

(57) ABSTRACT

Provided is an energy conversion apparatus including a diaphragm on which a coil of a lead pattern is formed, a magnet substrate configured to generate a magnetic field towards the coil on the diaphragm, and a magnetic film configured to generate magnetic force between the magnetic film and the magnet substrate to support the diaphragm therebetween.

10 Claims, 9 Drawing Sheets

(56) References Cited

FOREIGN PATENT DOCUMENTS

| | | |
|---|---|---|
| JP | 2010-251816 | 11/2010 |
| JP | 2010-268045 | 11/2010 |
| JP | 2013-243259 | 12/2013 |
| WO | WO 00/18182 A1 | 3/2000 |
| WO | WO 2005/022947 A2 | 3/2005 |

* cited by examiner

FIG. 4A

| | MAGNET SUBSTRATE (120mm × 90mm) | | | | NON-MAGNETIC SUBSTRATE (110mm × 90mm) | |
|---|---|---|---|---|---|---|
| | LEAKAGE MAGNETIC FIELD 1 (mT) | LEAKAGE MAGNETIC FIELD 2 (mT) | PITCH OF MAGNETIC PATTERN (mm) | THICKNESS (mm) | MATERIAL | THICKNESS (mm) |
| EXAMPLE 1 | ±24 | ±95 | 3 | 1 | CELLULOSE | 0.1 |
| EXAMPLE 2 | ±24 | ±95 | 3 | 1 | CELLULOSE | 0.2 |
| EXAMPLE 3 | ±24 | ±95 | 3 | 1 | CELLULOSE | 0.1 |
| EXAMPLE 4 | ±24 | ±95 | 3 | 1 | CELLULOSE | 0.2 |
| EXAMPLE 5 | ±24 | ±95 | 3 | 1 | CELLULOSE | 0.1 |
| EXAMPLE 6 | ±24 | ±95 | 3 | 1 | CELLULOSE | 0.2 |
| EXAMPLE 7 | ±95 | ±95 | 3 | 1 | CELLULOSE | 0.1 |
| EXAMPLE 8 | ±24 | ±95 | 3 | 1 | CELLULOSE | 0.1 |
| COMPARATIVE EXAMPLE 1 | ±24 | | 3 | 1 | CELLULOSE | 0.1 |

FIG. 4B

| DIAPHRAGM (115mm × 90mm) | | | | MAGNETIC FILM (FORMED ON PET OF 100 μm) | | | | |
|---|---|---|---|---|---|---|---|---|
| MATERIAL OF RESIN SUBSTANCE | COIL WIDTH / THICKNESS (mm) | COIL PITCH (mm) | IMPEDANCE (Ω) | MATERIAL | THICKNESS (mm) | PITCH, ETC. | SIZE | LEAKAGE MAGNETIC FIELD (mT) |
| POLYIMIDE | 0.5mm / 30μm | 3 | 11 | FERRITE | 0.2 | 3mm / 2 ON BOTH ENDS | 15mm × 115mm | 3 |
| POLYIMIDE | 0.5mm / 30μm | 3 | 11 | SmFe | 0.2 | 3mm / 3 ON BOTH ENDS | 20mm × 115mm | 5 |
| POLYIMIDE | 0.5mm / 35μm | 3 | 9 | FERRITE | 0.2 | 3mm / 2 ON BOTH ENDS | 15mm × 115mm | 3 |
| POLYIMIDE | 0.5mm / 35μm | 3 | 9 | SmFe | 0.2 | 3mm / 3 ON BOTH ENDS | 20mm × 115mm | 5 |
| POLYIMIDE | 0.5mm / 40μm | 3 | 6 | FERRITE | 0.2 | 3mm / 2 ON BOTH ENDS | 15mm × 115mm | 3 |
| POLYIMIDE | 0.5mm / 40μm | 3 | 8 | SmFe | 0.2 | 3mm / 3 ON BOTH ENDS | 20mm × 115mm | 5 |
| POLYIMIDE | 0.5mm / 30μm | 6 | 11 | FERRITE | 0.2 | 3mm / 2 ON BOTH ENDS | 15mm × 115mm | 3 |
| POLYIMIDE | 0.5mm / 30μm | 6 | 11 | FERRITE | 0.2 | 3mm / 2 ON BOTH ENDS | 15mm × 115mm | 3 |
| POLYIMIDE | 0.5mm / 30μm | 3 | 11 | — | — | — | — | — |

FIG. 5

| | IS DIAPHRAGM HELD WITHIN? | STICK TO FERROMAGNET? | EASILY DETACHED FROM FERROMAGNET? | ABSOLUTE SOUND PRESSURE (1 kHz) SPL (rms) : PEAK | ABSOLUTE SOUND PRESSURE (5 kHz) SPL (rms) : PEAK |
|---|---|---|---|---|---|
| EXAMPLE 1 | YES | YES | YES | 32 | 42 |
| EXAMPLE 2 | YES | YES | YES | 31 | 43 |
| EXAMPLE 3 | YES | YES | YES | 33 | 43 |
| EXAMPLE 4 | YES | YES | YES | 32 | 44 |
| EXAMPLE 5 | YES | YES | YES | 33 | 44 |
| EXAMPLE 6 | YES | YES | YES | 34 | 45 |
| EXAMPLE 7 | YES | YES | NO | 29 | 40 |
| EXAMPLE 8 | YES | YES | NO | 32 | 42 |
| COMPARATIVE EXAMPLE 1 | NO | NO | — | — | — |

FIG. 6A

| | MAGNET SUBSTRATE (120mm x 90mm) | | | | NON-MAGNETIC SUBSTRATE (110mm x 90mm) | |
|---|---|---|---|---|---|---|
| | LEAKAGE MAGNETIC FIELD 1 (mT) | LEAKAGE MAGNETIC FIELD 2 (mT) | PITCH OF MAGNETIC PATTERN (mm) | THICKNESS (mm) | MATERIAL | THICKNESS (mm) |
| EXAMPLE 1 | ±24 | ±95 | 3 | 1 | CELLULOSE | 0.1 |
| EXAMPLE 2 | ±24 | ±95 | 3 | 1 | CELLULOSE | 0.2 |
| EXAMPLE 3 | ±24 | ±95 | 3 | 1 | CELLULOSE | 0.1 |
| EXAMPLE 4 | ±24 | ±95 | 3 | 1 | CELLULOSE | 0.2 |
| EXAMPLE 5 | ±24 | ±95 | 3 | 1 | CELLULOSE | 0.1 |
| EXAMPLE 6 | ±24 | ±95 | 3 | 1 | CELLULOSE | 0.2 |
| COMPARATIVE EXAMPLE 1 | ±24 | ±95 | 3 | 1 | CELLULOSE | 0.1 |
| COMPARATIVE EXAMPLE 2 | ±24 | ±95 | 3 | 1 | CELLULOSE | 0.1 |
| COMPARATIVE EXAMPLE 3 | ±95 | ±95 | 3 | 1 | CELLULOSE | 0.1 |

FIG. 6B

| MATERIAL OF RESIN SUBSTANCE | DIAPHRAGM (115mm x 90mm) | | | | MAGNETIC FILM (FORMED ON PET OF 100 μm) | | | | LEAKAGE MAGNETIC FIELD (mT) |
|---|---|---|---|---|---|---|---|---|---|
| | COIL WIDTH / THICKNESS (mm) | SHAPE OF CROSS SECTION | COIL PITCH (mm) | IMPEDANCE (Ω) | MATERIAL | THICKNESS (mm) | PITCH, ETC. | SIZE | |
| POLYIMIDE | 0.5mm / 30μm | WAVELIKE | 3 | 2 | FERRITE | 0.2 | 3mm / 2 ON BOTH ENDS | 15mm × 115mm | 3 |
| POLYIMIDE | 0.5mm / 30μm | WAVELIKE | 3 | 2 | SmFe | 0.2 | 3mm / 3 ON BOTH ENDS | 20mm × 115mm | 5 |
| POLYIMIDE | 0.5mm / 35μm | WAVELIKE | 3 | 6 | FERRITE | 0.2 | 3mm / 2 ON BOTH ENDS | 15mm × 115mm | 3 |
| POLYIMIDE | 0.5mm / 35μm | WAVELIKE | 3 | 6 | SmFe | 0.2 | 3mm / 3 ON BOTH ENDS | 20mm × 115mm | 5 |
| POLYIMIDE | 0.5mm / 40μm | WAVELIKE | 3 | 11 | FERRITE | 0.2 | 3mm / 2 ON BOTH ENDS | 15mm × 115mm | 3 |
| POLYIMIDE | 0.5mm / 40μm | WAVELIKE | 3 | 11 | SmFe | 0.2 | 3mm / 3 ON BOTH ENDS | 20mm × 115mm | 5 |
| POLYIMIDE | 0.5mm / 30μm | FLAT | 3 | 2 | — | — | — | — | — |
| POLYIMIDE | 0.5mm / 30μm | FLAT | 6 | 2 | FERRITE | 0.2 | 3mm / 2 ON BOTH ENDS | 15mm × 115mm | 3 |
| POLYIMIDE | 0.5mm / 30μm | FLAT | 3 | 6 | FERRITE | 0.2 | 3mm / 2 ON BOTH ENDS | 15mm × 115mm | 3 |

FIG. 7

| | IS DIAPHRAGM HELD WITHIN? | STICK TO FERROMAGNET? | EASILY DETACHED FROM FERROMAGNET? | ABSOLUTE SOUND PRESSURE (1 kHz) SPL (rms) : PEAK | ABSOLUTE SOUND PRESSURE (5 kHz) SPL (rms) : PEAK |
|---|---|---|---|---|---|
| EXAMPLE 1 | YES | YES | YES | 53.5 | 45 |
| EXAMPLE 2 | YES | YES | YES | 55 | 47 |
| EXAMPLE 3 | YES | YES | YES | 50 | 42.5 |
| EXAMPLE 4 | YES | YES | YES | 52.5 | 44 |
| EXAMPLE 5 | YES | YES | YES | 48 | 40 |
| EXAMPLE 6 | YES | YES | YES | 50.5 | 42.5 |
| COMPARATIVE EXAMPLE 1 | NO | NO | NO | – | – |
| COMPARATIVE EXAMPLE 2 | YES | YES | YES | 25 | 48.5 |
| COMPARATIVE EXAMPLE 3 | YES | YES | NO | 25.5 | 56 |

ENERGY CONVERSION APPARATUS

CROSS-REFERENCE TO RELATED APPLICATIONS

This patent application is based on and claims priority pursuant to 35 U.S.C. §119(a) to Japanese Patent Application Nos. 2013-135117, filed on Jun. 27, 2013, and 2013-271030, filed on Dec. 27, 2013, in the Japan Patent Office, the entire disclosure of which is hereby incorporated by reference herein.

BACKGROUND

1. Technical Field

Example embodiments of the present invention generally relate to an energy conversion apparatus.

2. Background Art

An apparatus having a permanent magnet and a diaphragm is known as an energy conversion apparatus that performs conversion between electric energy and mechanical energy, and such an apparatus is used for flat loudspeakers, headphones, or microphones.

Generally, this type of apparatus includes a permanent magnet plate, a diaphragm arranged opposite the permanent magnet plate, a shock absorber placed between the permanent magnet plate and the diaphragm, and a supporting member that restricts the position of the diaphragm relative to the permanent magnet plate. In the energy conversion apparatus described above, a permanent magnet plate may be arranged only on one side of the diaphragm, instead of being arranged on both sides of the diaphragm.

SUMMARY

Embodiments of the present invention described herein provide an energy conversion apparatus including a diaphragm on which a coil of a lead pattern is formed, a magnet substrate configured to generate a magnetic field towards the coil on the diaphragm, and a magnetic film configured to generate magnetic force between the magnetic film and the magnet substrate to support the diaphragm therebetween.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIGS. 4A and 4B are a table showing the first set of conditions for conducting tests.

FIG. 5 is a table showing the results of tests conducted based on the first set of conditions of FIG. 4.

FIGS. 6A and 6B are a table showing the second set of conditions for conducting tests.

FIG. 7 is a table showing the results of tests conducted based on the second set of conditions of FIG. 6.

Figure 1:
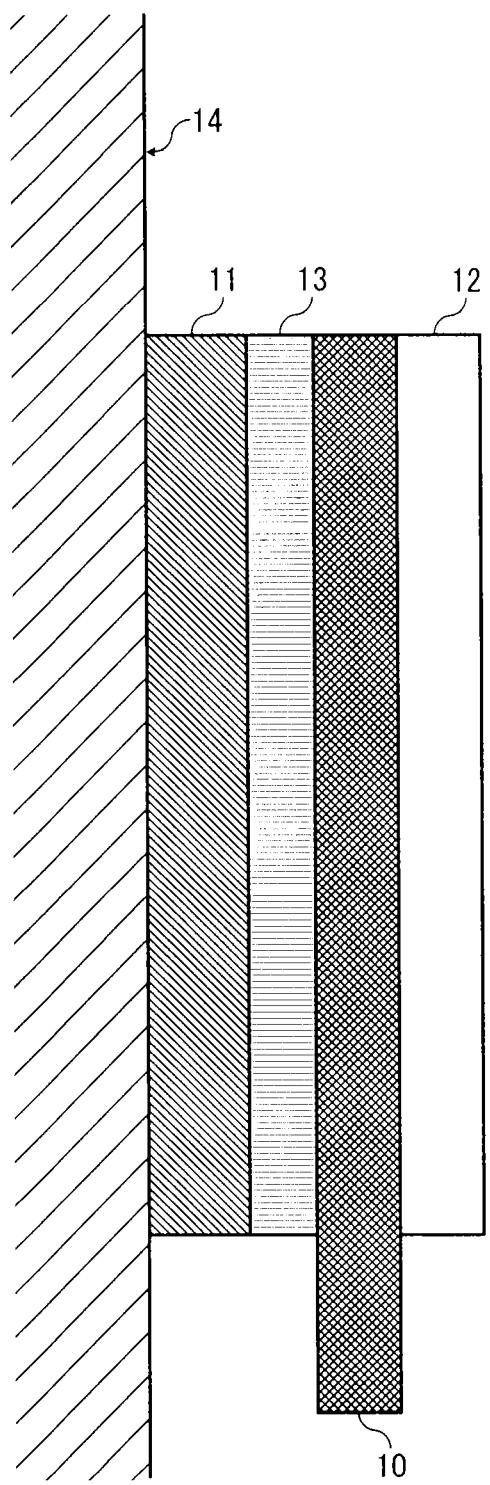
FIG. 1 is a side view of an example of the structure of an energy conversion apparatus, according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An energy conversion apparatus according to an embodiment of the present invention can be used for both electric-to-mechanical energy conversion and mechanical-to-electric energy conversion, and may be applied to flat loudspeakers, headphones, or microphones.

FIG. 1 is a side view of an example of the structure of an energy conversion apparatus, according to an example embodiment of the present invention. The energy conversion apparatus includes at least a diaphragm 10, a magnet substrate 11, and a magnetic film 12. In FIG. 1, the energy conversion apparatus further includes a non-magnetic substrate 13. The magnet substrate 11 generates magnetic force that makes the magnet substrate 11 and a ferromagnet 14 pull each other. Due to such magnetic force, the magnet substrate 11 sticks to the ferromagnet 14.

The ferromagnet 14 is intensively magnetized when placed in a magnetic field, and remains magnetic even when it is removed from the magnetic field. The ferromagnet 14 may be iron, cobalt, nickel, an alloy of these metals, ferrite, or samarium iron. The ferromagnet 14 may have any shape or size as long as the ferromagnet 14 can make the magnet substrate 11 stick to the ferromagnet 14.

The magnet substrate 11 generates magnetic force that makes the magnet substrate 11 and the ferromagnet 14 pull each other, and sticks to the ferromagnet 14. Moreover, the magnet substrate 11 generates magnetic force that pulls the magnetic film 12 which is made of a magnetic substance. Accordingly, adhesive is not necessary for the magnetic film 12 to stay attached.

One side of the magnet substrate 11 closely sticks to the ferromagnet 14, and the other side of the magnet substrate 11 is arranged to be adjacent to one side of the non-magnetic substrate 13. The other side of the non-magnetic substrate 13 is arranged to be adjacent to one side of the diaphragm 10, and the other side of the diaphragm 10 is arranged to be adjacent to the magnetic film 12. As described above, magnetic force is generated between the magnet substrate 11 and the magnetic film 12 to pull the magnetic film 12 towards the magnet substrate 11. Accordingly, the non-magnetic substrate 13 and the diaphragm 10 placed between the magnet substrate 11 and the magnetic film 12 are supported by the magnet substrate 11 and the magnetic film 12. Note that the diaphragm 10 is supported by the magnetic force described above so as to be oscillatable.

Conventionally, a cabinet is provided to fix the diaphragm 10 thereto and prevent the diaphragm 10 from flapping. However, such a cabinet becomes no longer necessary by adopting the supporting mechanism described above, and the diaphragm 10 can easily be fixed. In addition, the cost can be reduced by getting rid of a cabinet.

Conventionally, a hole is made through the magnet substrate 11 to fix the diaphragm 10 or the like to the magnet substrate 11 by combining them together by a supporting member that runs through the hole. However, such a hole is no longer necessary when the supporting mechanism described above is adopted, and thus the cost can be reduced.

For example, the magnet substrate 11 may be a square-shaped flat plate having parallelly-banded magnetic patterns where belt-like N-poles and S-poles alternate throughout the magnetic substrate 11. Such magnetic patterns can be made by laminating green magnet sheets together by sintering. Note that the shape of the magnet substrate 11 is not limited to a square-shaped flat plate, but may be circular, elliptic, or rectangular.

The magnet substrate 11 with magnetic patterns as described above has the largest magnetic field near the center of the magnet surface of each of the N-poles and S-poles, and has the smallest magnetic field around the boundaries between the N-poles and S-poles, in the orthogonal direction from the surface of the magnet substrate 11. In actuality, lines of magnetic force draw arcs from N-poles to S-poles, and the magnetic field in the horizontal direction with reference to the magnet surface contributes to the oscillation of the diaphragm 10. The magnetic field in the horizontal direction becomes most efficient around the boundaries between the N-poles and S-poles.

For this reason, a straight portion of a coil of lead patterns is arranged on the diaphragm 10 so as to correspond to the boundaries between the N-poles and S-poles of the magnet substrate 11. Accordingly, when an alternating current flows through the coil, the diaphragm 10 can efficiently be oscillated in its thickness direction in accordance with the Fleming's left-hand rule. At this time, the magnet substrate 11 generates a magnetic field in the vertical direction with reference to the extending direction of the coil.

It is desired that the lead patterns of the coil correspond to the magnetic patterns. In other words, it is desired that the intervals of the N-poles and S-poles of the magnet (pitches of magnetic patterns) be equal to the pitches of the coil. Note that complete match is not required, and it is only desired that these patterns be similar to each other. By achieving similar patterns as described above, the magnetic field (leakage magnetic field) that is generated around the magnet substrate 11 can efficiently be transmitted to the coil.

The magnet used herein may be a ferrite magnet, neodymium magnet, alnico magnet, or a samarium-cobalt magnet. For greater sound pressure, it is desired that a neodymium magnet be used to achieve greater magnetic force. However, other kinds of magnet may be used depending on the purpose.

As it is not necessary to make a hole on the magnet substrate 11 of the energy conversion apparatus as described above according to the present example embodiment of the present invention, the energy conversion apparatus may be applied to a device like a flat loudspeaker that outputs sound only in one direction (only to one side).

As described above, a coil of lead patterns is arranged on the diaphragm 10 so as to correspond to the boundaries between the N-poles and S-poles of the magnet substrate 11.

The diaphragm 10 may be a flexible resin substrate on which the coil of lead patterns is formed. The resin substrate may be made of polyethylene terephthalate (PET), polyimide, or polyethylene naphthalate (PEN) with the thickness of 10 to 30 μm.

Transparency is not required for a resin substrate, but a certain level of stiffness is required for the resin substrate to oscillate. For example, a polyimide substrate of 25 μm thickness on which a coil of 9 μm thickness is formed may be used as the diaphragm 10. Note that the elastic modules in bending of polyimide are about 3100 MPa, and the elastic modules in bending of PET and PEN are equally about 2200 MPa. When the oscillating area is larger, the amplitude becomes greater. Thus, when the oscillating area is larger, greater mechanical energy can be obtained.

For example, the coil may be formed by wet etching on a polyimide substrate having a copper foil thereon. The forming method is not limited to the method described above, but the coil may be formed by using a printing method such as screen printing with copper paste. Screen printing is preferred because the coil can be formed with uniform thickness and pitch. Note that the width or length of the coil is not freely determined but is defined by impedance. Moreover, the coil has a positive terminal and a negative terminal on both ends of the coil to be connected to a power source.

The non-magnetic substrate 13 is provided to prevent the diaphragm 10 from hitting the magnet substrate 11 and making noise when the diaphragm 10 oscillates. Moreover, the non-magnetic substrate 13 prevents the diaphragm 10 from causing divided oscillation. When the energy conversion apparatus according to the present example embodiment is used as a loudspeaker, the arrangement of the non-magnetic substrate 13 between the magnet substrate 11 and the diaphragm 10 prevents unwanted sound waves from being generated and only the sound wave consistent with the sound source is generated.

The non-magnetic substrate 13 may be made of any flexible non-magnetic material that has even thickness to hold the distance between the magnet substrate 11 and the coil to a fixed degree. The non-magnetic substrate 13 may be made of, for example, a cellulose fiber such as plain paper, Japan paper, and clean wipe. The non-magnetic substrate 13 may be made of a non-magnetic metal such as aluminum, but it is desired that the non-magnetic substrate 13 be made of nonmetal material such as paper because certain level of flexibility is required.

For example, it is preferred that the non-magnetic substrate 13 be made of a plain paper or clean paper that can be used in a clean room, and the thickness of the non-magnetic substrate 13 is preferably between a few μm to 0.5 mm. In consideration of a leakage magnetic field, it is preferred that the thickness of the non-magnetic substrate 13 range from tens of μm to hundreds of μm. Clean paper is dust-free, and thus is preferable when the energy conversion apparatus according to the present example embodiment is used as a loudspeaker and no cabinet is provided to cover the loudspeaker. Depending on the thickness, the non-magnetic substrate 13 may be equal to or smaller than the magnet substrate 11, or may consist of a plurality of parts that are arranged in lines.

The magnetic film 12 may be formed on a flexible transparent substrate, or may directly be formed on the diaphragm 10. The magnetic film 12 may be made of a magnetic material such as metal including iron, cobalt, ferrite, and samarium iron. The magnetic material used for the magnetic film 12 may be iron oxide that includes cobalt, nickel, manganese, or resin. The resin included in the iron oxide may be phenolic resin, epoxy resin, urethane resin, or silicon resin. In fact, the magnetic film 12 may be any magnetic material as long as it involves magnetism and sticks to a magnet.

The magnetic film 12 may be formed on a transparent substrate by using a printing method such as screen printing. It is not very common to form the magnetic film 12 by using a printing method, but the magnetic film 12 may be formed by using a mixture in which, for example, a magnetic substance made of ferrite and samarium iron is mixed with screen printing ink at a ratio of 6 to 4. More specifically, a magnetic substance is crushed by a rocking mill and formed like a paste before use. Then, the above mixture is formed on PET of 100 µm thickness by screen printing so as to fit the width defined by the pitches of magnetic patterns of the magnet substrate 11 and by the pitches of lead patterns. After that. the formed mixture is heated to be cured for thirty minutes at the temperature of 120° C. Note that the above is merely an example, and the method is not limited to the above ratio, temperature, or length of time.

Apart from the PET mentioned above, the transparent substrate may be cut from a film or the like that is made of polyester including polypropylene, polyethylene, polyimide, and PEN, in a suitable size.

The transparent substrate may be used just as it was cut from a film or the like in a suitable size, or may be used with a hole or holes made at a portion excluding the portion on which the magnetic film 12 is formed. When the energy conversion apparatus according to the present example embodiment is used as a loudspeaker, the coverage by the transparent substrate in its entirety may make the quality of the sound lower. The hole or holes made on the transparent substrate as described above may reduce or completely remove such deterioration in sound quality.

Alternatively, the magnetic film 12 may be formed on each of a plurality of small transparent substrates. These pieces of magnetic films 12 may be arranged together at a desired position to cover at least a part of the diaphragm 10. By so doing, a gap is formed among the transparent substrates, and sound can be output from the gap.

When the magnetic film 12 is directly formed on the diaphragm 10, ultrasonic cleaning using ethanol is firstly performed on the surface of the diaphragm 10 on which a coil has been formed, and then the magnetic film 12 is formed on the diaphragm 10 by using a printing method such as screen printing, in a similar manner to cases where the magnetic film 12 is formed on a transparent substrate.

Figure 2:
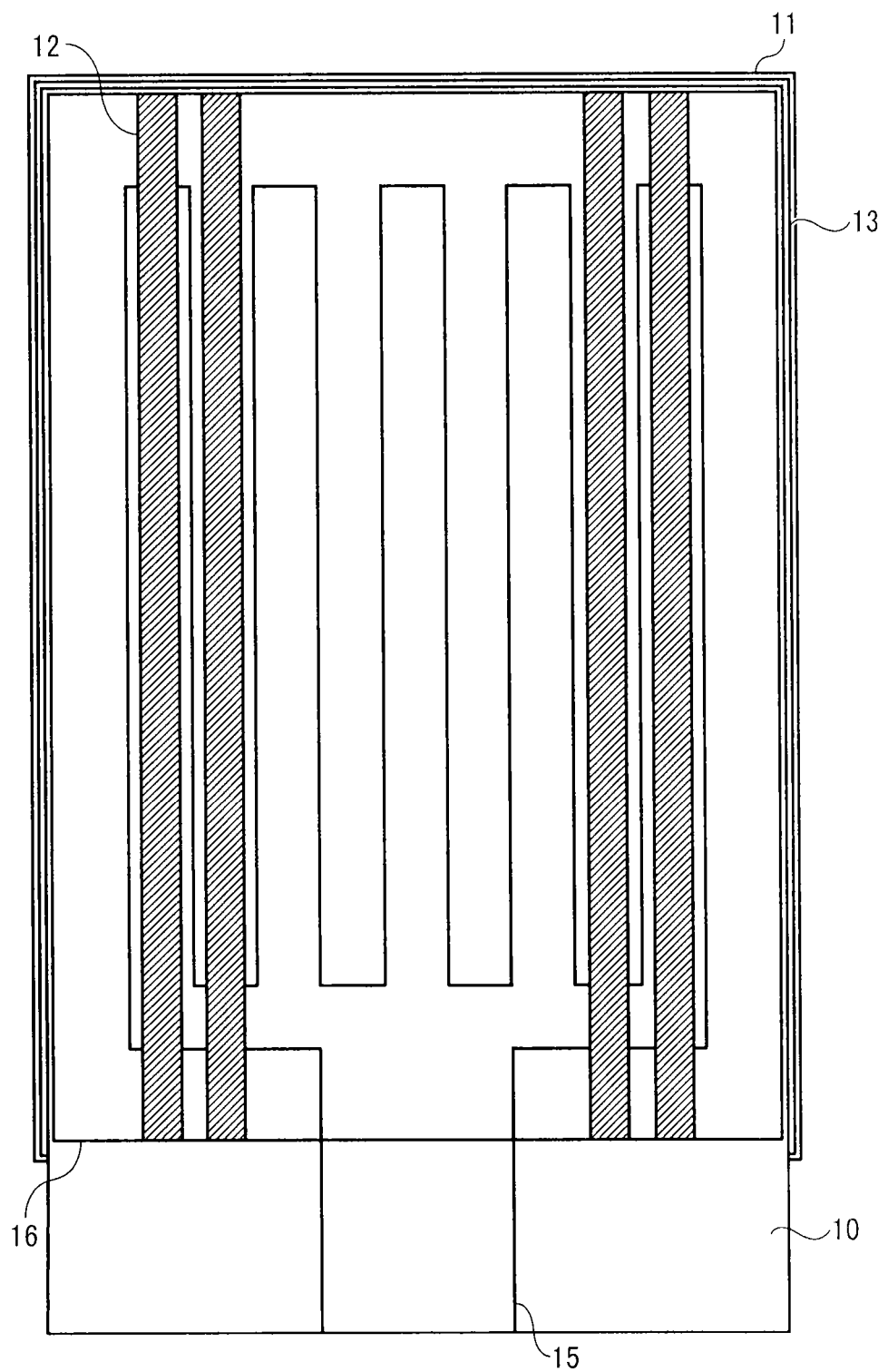
FIG. 2 is a plan view of the energy conversion apparatus illustrated in FIG. 1.

FIG. 2 is a plan view of the energy conversion apparatus illustrated in FIG. 1. A coil 15 and the magnetic film 12 are described in detail with reference to the plan view of FIG. 2. The energy conversion apparatus is provided with the magnet substrate 11, a transparent substrate on which the magnetic films 12 are formed, the non-magnetic substrate 13, and the diaphragm 10 on which the coil 15 is formed. These elements may be equally sized except the diaphragm 10, but an element arranged above another element is shown a little smaller in FIG. 2.

The non-magnetic substrate 13 of rectangular shape is disposed on the magnet substrate 11 of rectangular shape, and the diaphragm 10 of rectangular shape is disposed thereupon. A rectangular transparent substrate on which the magnetic films 12 are formed is disposed thereupon as a magnetic substrate 16. Accordingly, magnetic force is generated between the magnet substrate 11 and the magnetic films 12. Due to this magnetic force, the non-magnetic substrate 13 and the diaphragm 10 placed between the magnet substrate 11 and the magnetic films 12 are supported by the magnet substrate 11 and the magnetic films 12.

As illustrated in FIG. 2, the coil 15 has two terminals at the bottom. These two terminals have meandering or pulsed lead patterns, and are connected to a power source. Due to such lead patterns, an extending U-shaped coil is provided over each boundary of the N-poles and S-poles of the magnetic patterns that are formed on the magnet substrate 11.

The magnetic films 12 are arranged over the lead patterns formed on the diaphragm 10, such that each of the magnetic films 12 does not directly overlap but is positioned closely between the lines of extending U-shaped coil. As illustrated in FIG. 2, the magnetic films 12 may be provided only on both right and left sides with reference to the transparent substrate as long as these magnetic films 12 can support the non-magnetic substrate 13 and the diaphragm 10 therebetween.

In FIG. 2, the magnetic films 12 are arranged in two lines on both right and left sides, respectively. However, the magnetic film 12 may be arranged in a single line on both right and left sides, respectively, or the magnetic film 12 may be arranged in the center.

In the energy conversion apparatus according to the present example embodiment, an alternating current is passed through the coil 15 to generate physical force in the thickness direction of the diaphragm 10, and this force makes the diaphragm 10 oscillate in its thickness direction. Due to this oscillation, conversion from electric energy to mechanical energy is achieved. The mechanical energy makes the air vibrate to output sound waves. In the energy conversion apparatus according to the present example embodiment, conversion from mechanical energy to electric energy is also achieved by making the diaphragm 10 oscillate by sound waves and thereby generating an alternating current at the coil 15 in accordance with the Fleming's left-hand rule. Due to the former conversion from electric energy to mechanical energy, the energy conversion apparatus according to the present example embodiment can be used as a headphone or loudspeaker. Due to the latter conversion from mechanical energy to electric energy, the energy conversion apparatus according to the present example embodiment can be used as a microphone.

The magnetic films 12 may be magnetized, but it is desired that the leakage magnetic field caused by the magnetic films 12 be smaller than the minimum leakage magnetic field of the magnet substrate 11 in order to cause magnetic force that makes the magnetic films 12 and the magnet substrate 11 pull each other.

The magnet substrate 11 may be magnetized such that the strength of the leakage magnetic field towards the diaphragm 10 is equal to the strength of the leakage magnetic field towards the ferromagnet 14 on the opposite side. Alternatively, the magnet substrate 11 may be magnetized such that the leakage magnetic field towards the diaphragm 10 is stronger than the leakage magnetic field towards the ferromagnet 14 on the opposite side.

Magnetization is the process of magnetizing a magnetic substance so as to be able to pull other pieces of metal towards itself, and it is achieved, for example, by generating an external magnetic field with an electromagnet. When such magnetization is performed only on one side of the magnetic substance, the other side of the magnetic substance is also magnetized. However, it is possible to control the level of magnetization to be stronger on the side where magnetization is actually performed.

When the magnet substrate 11 is magnetized such that the leakage magnetic fields on both sides become equal to each other, the leakage magnetic fields become strong on both sides. Accordingly, when the magnet substrate 11 is attached to the ferromagnet 14, it is difficult to remove the magnet substrate 11 from the ferromagnet 14. By contrast, when only one side is magnetized as described above, the leakage magnetic field on the other side becomes relatively week. In this case, it is easy to attach the magnet substrate 11 to the ferromagnet 14, and it is easy to remove the magnet substrate 11 from the ferromagnet 14. This realizes easy handling of the magnet substrate 11.

In the example embodiment described with reference to FIGS. 1 and 2. both the diaphragm 10 and the magnet substrate 11 are flat plates. Accordingly, when they arc used as a loudspeaker, it may be difficult or unable to generate a low-pitched sound while a high-pitched sound can be generated. This is because large vibration is required to generate a low-pitched sound, but it is difficult for flat components to achieve such large vibration due to limited space between the non-magnetic substrate 13 and the coil 15.

Figure 3:
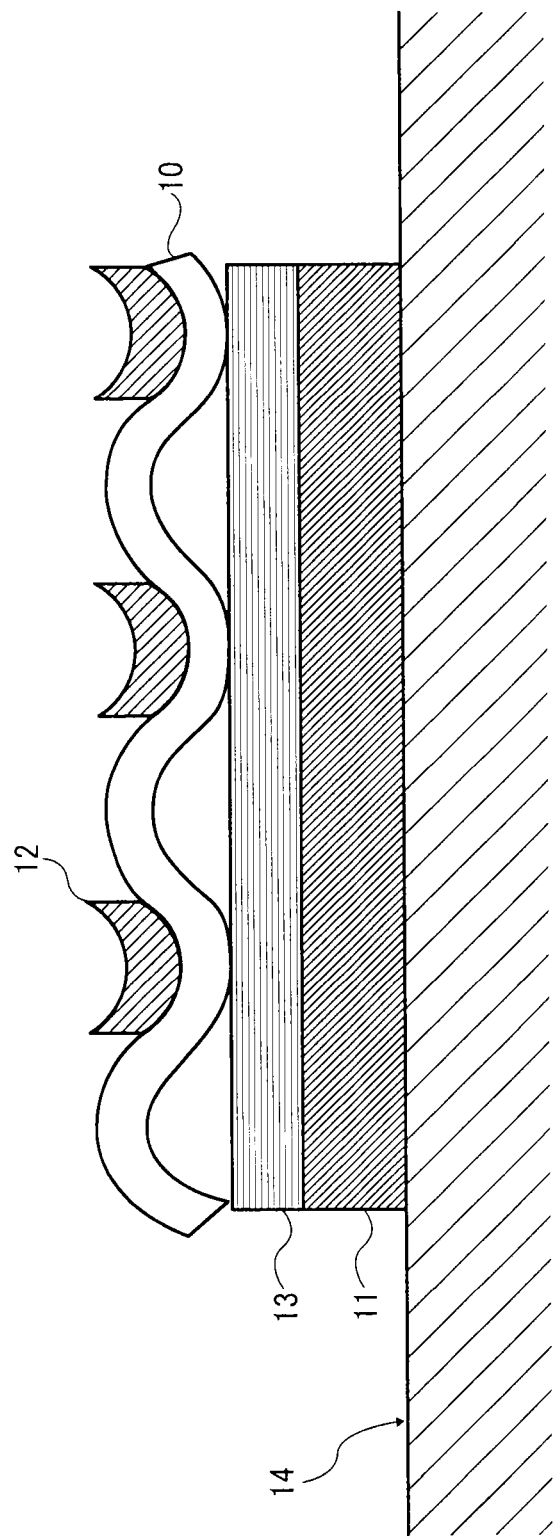
FIG. 3 is a side view of another example of the structure of an energy conversion apparatus, according to an example embodiment of the present invention.

In order to achieve a low-pitched sound, the diaphragm 10 may be shaped such that its cross section has the shape of a wave, as illustrated in FIG. 3. In this arrangement, the coil 15 is formed at top portions of the diaphragm 10 that are furthest from the non-magnetic substrate 13, and the magnetic films 12 whose cross sections are U-shaped are disposed on bottom portions of the diaphragm 10 that are the closest to the non-magnetic substrate 13. By arranging wider space between the non-magnetic substrate 13 and the coil 15 as described above to increase the distance therebetween, it becomes possible to achieve large vibration. The diaphragm 10 and the non-magnetic substrate 13 are well supported by the magnetic force generated between the magnetic films 12 and the magnet substrate 11.

It is desired that the diaphragm 10 be formed as follows. Firstly, the diaphragm 10 is formed such that the pitches of the lead patterns of the coil 15 are wider than the pitches of magnetic patterns where the N-poles and S-poles of the magnet substrate 11 alternately appear. Then, the diaphragm 10 is formed, for example, by being placed in a mold and pressurized, such that the pitches of lead patterns become approximately equal to the pitches of magnetic patterns and its cross section is shaped like a wave.

The pitches of the lead patterns of the coil 15 are made approximately equal to the pitches of magnetic patterns as described above, and each of the extending U-shaped portions of the lead patterns is positioned such that the boundary of an N-pole and S-pole of the magnet substrate 11 is at the center of the extending U-shaped portion. Accordingly, the leakage magnetic field becomes stronger, and it becomes possible to output a low-pitched sound with sufficient sound pressure.

The magnetic film 12 may be formed on each bottom portion of a transparent substrate whose cross section is formed like a wave, so as to fit the diaphragm 10 whose cross section is formed like a wave. Alternatively, the magnetic films 12 may directly be formed on the diaphragm 10.

When the magnetic films 12 are directly formed on the diaphragm 10, ultrasonic cleaning using ethanol is firstly performed on the surface of the diaphragm 10 on which a coil has been formed, and the magnetic films are is then formed on the diaphragm 10 by using a printing method such as screen printing. When the energy conversion apparatus according to the present example embodiment is used as a loudspeaker, the coverage of the entirety of the diaphragm 10 may make the quality of the output sound lower. In order to prevent such sound deterioration, the magnetic films 12 may be arranged on both ends of the diaphragm 10 in one or two lines, respectively, or may be arranged on both ends and at the center of the diaphragm 10 in three lines in total. The arrangement of the magnetic films 12 is not limited to the above, and for example, the magnetic films 12 may be arranged in three lines on both ends of the diaphragm 10, respectively.

An energy conversion apparatus is used as a loudspeaker, and several kinds of tests are conducted. FIGS. 4A and 4B are a table showing the first set of conditions for conducting these tests. The loudspeaker is a flat loudspeaker that has the structure as illustrated in FIGS. 1 and 2. The flat loudspeaker includes the magnet substrate 11, the non-magnetic substrate 13, the diaphragm 10, and the magnetic substrate 16 for which the magnetic film 12 is provided. The shape of these elements is all rectangular.

In Examples 1 to 7 and Comparative Example 1, the magnet substrate 11 is formed such that the leakage magnetic field towards the diaphragm 10 becomes stronger than the magnetic field towards the ferromagnet 14 at the ratio of ±95 mT to ±24 mT. Only in Example 8, the magnet substrate 11 is formed such that the leakage magnetic fields on both sides become equally ±95 mT. In Examples 2, 4, and 6, the thickness of the non-magnetic substrate 13 is made 0.2 mm that is twice larger than the other examples and Comparative Example 1. In Examples 3 and 4, the thickness of the coil 15 is made 35 μm that is larger than the other examples and comparative example by 5 μm. In Examples 5 and 6, the thickness of the coil 15 is made 40 μm that is larger than the other examples and comparative example by 10 μm. In Examples 7 and 8, the pitches of the coil 15 are made 6 mm that is twice larger than the other examples and Comparative Example 1.

In Examples 1, 3, 5, 7, and 8, the material of the magnetic films 12 is ferrite, and its size is 15 mm multiplied by 115 mm. The number of the magnetic films 12 is two. In Examples 2, 4, and 6, the material of the magnetic films 12 is samarium iron (SmFe), and its size is 20 mm multiplied by 115 mm. The number of the magnetic films 12 is three. The magnetic films 12 are formed on a LUMIRROR (registered trademark, Toray Industries, Inc.) of 100 μm thickness by using a printing method as described above. As ferrite, OP-56 manufactured by DOWA F-Tec Co., Ltd. is used. As SmFe, J16 manufactured by Nichia Corporation is used. As ink for screen printing, low-temperature curing adhesive (RCA) (registered trademark, TAIYO INK MFG. CO., LTD.)-2000 is used. The magnetic films 12 are cured at 120° C. for thirty minutes.

FIG. 5 is a table showing the results of tests conducted based on the first set of conditions of FIG. 4. In all of Examples 1 to 8, the diaphragm 10 is held by the magnetic films 12 within a loudspeaker, and thus sufficient sound pressure was achieved at absolute sound pressure of 1 to 5 kHZ. Moreover, the energy conversion apparatus was successfully stuck to the ferromagnet 14. However, in Example 8, it was not easy to detach the energy conversion apparatus because the leakage magnetic fields on both sides were equal to each other and the strength was high at ±95 mT. In Comparative Example 1, the diaphragm 10 could not be held due to the absence of the magnetic films 12, and the energy conversion apparatus failed to make a sound.

According to these results, it was found that favorable acoustic properties can be achieved by the simple structure in which the non-magnetic substrate 13 and the diaphragm 10 are held between the magnet substrate 11 and the magnetic films 12 by the magnetic force generated therebetween. Moreover, it was found that the diaphragm 10 could easily be fixed by sandwiching it with simple structure, and that the energy conversion apparatus could easily be detached from the ferromagnet 14 by making the leakage magnetic field of the magnet substrate 11 weaker on the ferromagnet 14 side.

When the results of Examples 1 to 6 are compared with the results of Example 7, it was found that the absolute sound pressure is greater and acoustic properties are superior in Examples 1 to 6 where the pitches of lead patters and the pitches of magnetic patterns are equally at 3 mm. Moreover, it was found that the thickness of the non-magnetic substrate 13, the thickness of the coil 15, the material of the magnetic films 12, and the number and size of the magnetic films 12 have little influence on the absolute sound pressure.

As described above, according to the energy conversion apparatus according to the example embodiment of the present invention, the diaphragm 10 can easily be fixed and favorable acoustic properties can be achieved by the simple structure in which the diaphragm 10 is held between the magnet substrate 11 and the magnetic films 12 by the magnetic force generated therebetween. It is preferred that the leakage magnetic field of the magnet substrate 11 towards the diaphragm 10 be made stronger than the leakage magnetic field towards the ferromagnet 14 on the opposite side, in order to achieve easy detachment of the energy conversion apparatus. Moreover, it is preferred that the pitches of lead patterns be made approximately equal to the pitches of magnetic patterns to achieve greater sound pressure.

FIGS. 6A and 6B are a table showing the second set of conditions for conducting tests, where a flat loudspeaker illustrated in FIG. 3 is used. The flat loudspeaker includes the magnet substrate 11, the non-magnetic substrate 13, the diaphragm 10, and a transparent substrate for which the magnetic film 12 is provided. The shape of these elements is all rectangular.

In all of Examples 1 to 6, a diaphragm whose cross section is shaped like a wave is used as the diaphragm 10. In Comparative Examples 1 to 3, a flat diaphragm is used as the diaphragm 10. Note that the flat loudspeaker to which the configuration illustrated in FIG. 1 is applied is used in Comparative Examples 2 and 3 in order to make a comparison in terms of a difference in the shape of a diaphragm. In Examples 1 to 6 and Comparative Examples 1 and 2, the magnet substrate 11 is formed such that the leakage magnetic field towards the diaphragm 10 becomes stronger than the magnetic field towards the ferromagnet 14 at the ratio of ±95 mT to ±24 mT. Only in Comparative Example 3, the magnet substrate 11 is formed such that the leakage magnetic fields on both sides become equally ±95 mT. In Examples 2, 4, and 6, the thickness of the non-magnetic substrate 13 is made 0.2 mm that is twice larger than the other examples and Comparative Example 1. In Examples 3 and 4, the thickness of the coil 15 is made 35 μm that is larger than the other examples and comparative example by 5 μm. In Examples 5 and 6, the thickness of the coil 15 is made 40 μm that is larger than the other examples and comparative example by 10 μm.

In Examples 1 to 6 and Comparative Example 2, the pitches of the coil 15 are made 6 mm that is twice larger than the other examples and comparative examples. In Examples 1 to 6, the diaphragm 10 is then shaped like a wave to make the pitches of the coil 15 be 3 mm that is equal to the pitches of magnetic patterns.

In Examples 1, 3, and 5 and Comparative Examples 2 and 3, the material of the magnetic film 12 is ferrite, and its size is 15 mm multiplied by 115 mm. The number of the magnetic films 12 is two. In Examples 2, 4, and 6, the material of the magnetic film 12 is samarium iron (SmFe), and its size is 20 mm multiplied by 115 mm. The number of the magnetic films 12 is three. The magnetic films 12 are formed on a LUMIRROR (registered trademark, Toray Industries, Inc.) of 100 μm thickness by using a printing method as described above. As ferrite, OP-56 manufactured by DOWA F-Tec Co., Ltd. is used. As SmFe, J16 manufactured by Nichia Corporation is used. As ink for screen printing, low-temperature curing adhesive (RCA) (registered trademark, TAIYO INK MFG. CO., ETD.)-2000 is used. The magnetic films 12 are cured at 120° C. for thirty minutes.

FIG. 7 is a table showing the results of tests conducted based on the second set of conditions of FIG. 6. In all of Examples 1 to 6 and Comparative Examples 2 and 3, the diaphragm 10 was held by the magnetic films 12 within a loudspeaker, and thus sufficient sound pressure was achieved at absolute sound pressure of 1 to 5 kHZ. Moreover, the energy conversion apparatus was successfully stuck to the ferromagnet 14.

However, in Comparative Example 3, it was not easy to detach the energy conversion apparatus because the leakage magnetic fields on both sides were equal to each other and the strength was high at ±95 mT. In Comparative Example 3, a sufficient sound pressure of high-pitched sound was achieved that was greater than those of Examples 1 to 6. However, only about a half sound pressure was obtained with respect to a low-pitched sound. Also in Comparative Example 2, a sufficient sound pressure of high-pitched sound was achieved that was greater than those of Examples 1 to 6. However, only about a half sound pressure was obtained with respect to a low-pitched sound.

In Comparative Example 1, the diaphragm 10 could not be held because of the absence of the magnetic film 12, and the energy conversion apparatus failed to make a sound.

According to these results, it was found that favorable acoustic properties can be achieved by the simple structure in which the non-magnetic substrate 13 and the diaphragm 10 are held between the magnet substrate 11 and the magnetic films 12 by the magnetic force generated therebetween. In addition to that, even more favorable acoustic properties can be achieved by making the shape of the cross section of the diaphragm 10 be formed like a wave.

Further, a measuring microphone (Type 4152) manufactured by ACO Co., Ltd. was used to measure the sound output from a loudspeaker. A music compact disc (CD) was used as a sound source, and the peak value during the same time periods was used. As a result, it was found that when the diaphragm 10 whose cross section is shaped like a wave was used. a low-pitched sound, in particular, the sound at 700 Hz to 3 kHz, became louder than when a flat diaphragm was used.

Accordingly, it is considered to be desirable that the cross section of the diaphragm 10 be shaped like a wave, rather than the diaphragm 10 being a flat plate. It is preferred that the leakage magnetic field of the magnet substrate 11 towards the diaphragm 10 be made stronger than the leakage magnetic field towards the ferromagnet 14 on the opposite side, in order to achieve easy detachment of the energy conversion apparatus. Moreover, it is preferred that the pitches of lead patterns be made approximately equal to the pitches of magnetic patterns to achieve greater sound pressure.

In a design of loudspeaker enclosure including one with a passive radiator (drone cone), the resonance frequency that determines the sound quality may be controlled simply by changing the impedance or inductance. In loudspeakers where the magnet substrate 11 is simply disposed on one side of the diaphragm 10 (i.e., loudspeakers that are open on one side). it is difficult to determine the resonance frequency simply by changing the impedance or inductance because there is difficulty in fixing the diaphragm. However, a displacement towards the inside of the plane can be controlled and the diaphragm 10 can easily be fixed due to the magnetic film 12. Thus, the resonance frequency can be determined by changing the impedance or inductance. Accordingly, even when the loudspeakers that are open on one side are used, it becomes possible to achieve acoustic properties as desired.

Accordingly, the energy conversion apparatus according to an embodiment of the present invention can be used as flat loudspeakers, headphones, or microphones.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An apparatus, comprising:
   a diaphragm on which a coil of a lead pattern is formed;
   a magnet substrate to generate a magnetic field towards the coil on the diaphragm; and
   a magnetic film to generate magnetic force between the magnetic film and the magnet substrate to support the diaphragm therebetween.

2. The apparatus according to claim 1, wherein
   the diaphragm is flexible,
   the magnet substrate generates the magnetic field in a vertical direction with reference to an extending direction of the coil, and
   the magnetic film supports the diaphragm so as to be oscillatable by the magnetic force generated between the magnetic film and the magnet substrate.

3. The apparatus according to claim 1, further comprising:
   a non-magnetic substrate disposed between the magnet substrate and the diaphragm, the non-magnetic substrate being flexible so as to keep a distance at a constant level between the magnet substrate and the coil.

4. The apparatus according to claim 1, wherein
   the diaphragm has a wave-like cross section.

5. The apparatus according to claim 1, wherein
   the magnetic film is disposed so as to closely cover at least a portion of the diaphragm.

6. The apparatus according claim 1, further comprising
   a transparent substrate on which the magnetic film is formed,
   wherein
   the magnetic film extends over the transparent substrate in one direction, and is disposed so as not to overlap directly but to be positioned closely between leads of the coil that extend in the one direction.

7. The apparatus according to claim 6, wherein
   the transparent substrate has a hole on at least a portion of the transparent substrate excluding a portion on which the magnetic film is formed.

8. The apparatus according to claim 1, wherein
   the magnetic film is formed by screen printing.

9. The apparatus according to claim 1, wherein
   the magnet substrate is magnetized such that a leakage magnetic field on a side where the diaphragm is formed is stronger than a leakage magnetic field on an opposite side of the side where the diaphragm is formed.

10. The apparatus according to claim 1, wherein
    a leakage magnetic field from the magnetic film is smaller than a minimum leakage magnetic field of the magnet substrate.

\* \* \* \* \*